United States Patent [19]

Howeth

[11] Patent Number: 4,749,192
[45] Date of Patent: Jun. 7, 1988

[54] FLUID COUPLING CONSTRUCTION FOR NON-PRESSURE BALANCED FLUID CONDUCTING SWIVEL JOINTS

[76] Inventor: D. Franklin Howeth, 233 Chuck Wagon Trail, Forth Worth, Tex. 76115

[21] Appl. No.: 107,963

[22] Filed: Oct. 13, 1987

Related U.S. Application Data

[63] Continuation-in-part of Ser. No. 882,180, Jul. 7, 1986, abandoned.

[51] Int. Cl.$^4$ .............................................. F16L 15/00
[52] U.S. Cl. ...................................... 285/86; 285/276; 285/305
[58] Field of Search ............... 285/305, 276, 403, 404, 285/86; 403/165, 78; 384/508, 585, 510, 537, 539, 561, 901, 903, 906

[56] References Cited

U.S. PATENT DOCUMENTS

| | | | |
|---|---|---|---|
| 1,893,574 | 1/1933 | Anderson | 384/906 X |
| 2,343,491 | 3/1944 | Bard et al. | |
| 2,677,933 | 5/1954 | Hopkinson | |
| 2,749,151 | 6/1956 | Lyons | |
| 3,142,498 | 7/1964 | Press | |
| 3,517,952 | 6/1970 | McCracken | 285/276 |
| 4,059,295 | 11/1977 | Helm | 285/305 |
| 4,221,408 | 9/1980 | Lochte et al. | 285/276 |
| 4,561,681 | 12/1985 | Lebsock | 285/276 |
| 4,606,656 | 8/1986 | LaRow | 384/906 X |

FOREIGN PATENT DOCUMENTS

| | | | |
|---|---|---|---|
| 233336 | 5/1964 | Austria | 285/305 |
| 862533 | 1/1953 | Fed. Rep. of Germany | 285/276 |
| 1230857 | 5/1971 | United Kingdom | 285/305 |

OTHER PUBLICATIONS

Aeroquip—"FS 5900 Std. Duty Full Flow Swivel Joint"—p. 14.
T–M—Swivel Joints, T–M Mfg. Co.
Hydraulics, Inc.–"S Series/In-Line 3000 PSI Full Flow"—p. 4.

Primary Examiner—Dave W. Arola
Attorney, Agent, or Firm—Hubbard, Thurman, Turner & Tucker

[57] ABSTRACT

A non-pressure balanced fluid conducting swivel joint for coupling high pressure hydraulic conduit comprised of first and second tubular housing sections which are coaxially interfit with each other and a tubular sleeve member supported intervening between superposed portions of the housing sections. The sleeve is secured thrust resistant and for rotation to the inner of the housing sections via a pair of spaced apart annular races containing bearings extending between the inner housing section and the sleeve member. The outer housing is rotationally interlocked with the sleeve member by virtue of a flexible circumscribing pin engaging an insert contained in an annular groove complementary formed between the outer periphery of the sleeve member and the inner diameter of the outer housing. An external slot permits insertion and removal of the driving pin that includes a tang at its outer end which when the pin is operably contained in the groove can be removed for disassembly of the housing sections to effect servicing of the internal seal. An external sleeve when mounted about the slot of the outer housing serves to shroud the slot and tang from ready access so as to minimize tampering and potential environmental damage.

19 Claims, 3 Drawing Sheets

FLUID COUPLING CONSTRUCTION FOR NON-PRESSURE BALANCED FLUID CONDUCTING SWIVEL JOINTS

This application is a continuation-in-part of application U.S. Ser. No. 882,180 filed July 7, 1986 and now abandoned.

TECHNICAL FIELD

The field of art to which the invention pertains comprises the art of swivel joint couplings for connecting high pressure fluid conduit.

BACKGROUND OF THE INVENTION

Couplings of various types for the joining of fluid conduit are widely utilized and marketed. One such coupling is the non-pressure balanced joint type adapted to effect a swivel movement and particularly suited for the joining of conduit containing fluid at relatively high pressures. Such swivel couplings are widely utilized in a variety of hydraulic applications and typically are comprised of relatively rotatable tubular housing sections interfitted to form a swivel joint. The joint provides for the relative rotation while being also designed to withstand the internal fluid thrust forces urging separation of the housing sections. Prior art devices of the foregoing type are disclosed in U.S. Pat. Nos. 2,343,491; 2,677,933; 2,749,151; and 3,142,498.

In an exemplary type construction, the swivel joint is generally comprised of a pair of interfitting tubular housings mechanically joined through a thrust load bearing which permits relative rotation between the housings. An annular elastomeric seal is normally interposed between the interfitted sections for preventing fluid leakage of contained high pressure fluid to outward of the joint.

Various factors characterize such couplings in that the elastomeric seal is subject to wear and the adverse effects of aging. As a consequence, the seal requires periodic replacement and therefore represents a regular maintenance item for which access to the seal area is necessary. Access normally involves a separation or disassembly of the separate housing components. However, the designs of such joints is frequently dominated by the thrust and bearing features as to result in a construction of undue complexity that is difficult to disassemble for servicing. Because of the complexity of construction, disassembly for replacement of the seal is inherently resisted by the features which provide for the bidirectional rotational action and thrust resistance between the interfitted sections during operation of the swivel. Since the thrust and rotational features represent operational parameters in contrast with the maintenance feature of seal replacement, the former are normally given dominant design consideration at the expense of the latter. By that standard, maximum bearing life is obtained under the loads to be encountered for effectively enhancing life expectancy of the joint as a whole.

Typically, the rolling bearing members are generally pins or balls and are utilized in one of three basic constructions by which the bearing races are incorporated. Each of the three basic constructions are commercially available and include a first construction as for example marketed commercially by Aeroquip Corp. as their model FS5900 Series Swivel Joint. In this construction a roller or ball thrust bearing is interposed between the joined housing sections. The bearing is generally contained in one of the housings by a rotational torque resisting threaded retainer. For incorporating the swivel feature, this bearing method is normally utilized with a significantly large first housing and a relatively complex rotational resistant bearing retention structure.

A second commercial form of such couplings is marketed by Hydraulic, Inc. as its S series In-Line 3000 psi/Full Flow joint. Complementary roller races in this construction are formed in the overlap between housings in which pins or balls are loaded through an outwardly extending aperture that communicates with the races. The fluid conducting swivel of this construction requires the bearing be disassembled in order to replace the resilient seal. Moreover, because of the critical location of the loading aperture, it requires that particular attention be given to the permanency of the aperture with the view of providing for ready access when seal replacement becomes necessary.

A third commercial embodiment is of a type for example marketed by T-M Manufacturing Company in which a tubular sleeve like component is interposed between the interfitted housing sections. The sleeve member affords complementary races with the inner of the housing sections thereat and in which the pins or balls are loaded via an aligned aperture extending radially outward through the sleeve. When the races are loaded, the aperture is permanently closed. Securement of the tubular member to the outer of the housing sections involves a relatively complex rotational resistant threaded connection resulting in considerable and otherwise unnecessary bulk. Tampering with the permanent closure of the roller loading aperture has proven to be a problem in that construction.

By virtue of the dominant consideration given to the design of the thrust and rotational bearing features in the foregoing structures it should be apparent that the servicing aspects have been largely ignored in being regarded as a secondary consideration. As a consequence, servicing of such devices of the prior art have proven unnecessarily difficult and expensive. Despite recognition of the problem, a ready solution therefore had not heretofore been known.

SUMMARY OF THE INVENTION

This invention relates to swivel joint type hydraulic couplings for interconnecting sections of conduit containing high pressure fluid. More specifically, the invention relates to an improved non-pressure balanced type conducting swivel joint in which interfitted housing sections are more easily assembled and disassembled for servicing than similar purpose constructions of the prior art without sacrificing the required thrust resistance and rotational features thereof. This is achieved in a threadless connection which not only overcomes the previous difficulties of servicing and aperture tampering, but does so while maintaining the rotational and thrust resistant properties at the established operating levels required for such swivel joint apparatus. At the same time the tampering problems previously associated with the roller loading aperture is substantially, if not completely, eliminated by an improved permanent closure structure therefor.

The foregoing is achieved in accordance with the present invention in which the swivel joint hereof is comprised of first and second tubular housings which interfit coaxially with each other and a tubular sleeve like member that is supported intervening between the superposed portions of the housings. The sleeve member provides for joinder of the elements by being separately connected to the first and second housing sections. Formed internally of the sleeve is a semi-spherical annular roller bearing race positioned to complement the inner roller bearing race on the inner housing section. By virtue of the bearings contained in the races, rotation and thrust resistance is afforded between the sleeve member and inner housing. The outer housing that surrounds the sleeve member is secured in a driving rotational interlock relation therewith by means of a driving pin circumscribing the annulus of the bearing races internally between the sleeve and outer housing section in cooperation with an insert secured to the sleeve. The pin is readily removable for disassembly of the housing whereby access to the resilient seal for seal servicing is provided.

In an important aspect, the present invention is comprised of one or more complementing roller bearing races with permanently closed loading aperture ports in the sleeve member extending in radial alignment with the races. The circumference of the sleeve in cooperation with the surrounding internal diameter of the outer housing defines an annular clearance which is unobstructed by the permanent aperture closure plugs secured press fit in the loading ports. By means of the port plugs being flush or beneath the periphery of the sleeve in a counterbore at the outward end of the port, the internal face of the plugs engage the annular periphery of the balls thereat for assisting in transmission of the rotational drive between the sleeve and the inner housing.

In another important aspect of the invention there is provided a relatively round or square cross-sectioned pin of relatively resilient composition that can be inserted into an annular groove formed complementary positioned through the outer housing. When inserted, the pin circumscribes the annulus formed by the complementary grooves in the inner housing and sleeve defining the bearing races and is operably adapted to rotationally engage an insert secured to the sleeve. For inserting the pin, there is provided an arcuate slot in the outer housing radially complementing the grooves in which the pin is to be received. The pin is provided with an offset tang at its outer terminus adapted to be positioned in the slot to prevent total insertion within the annulus and in which position the tang is responsive to rotational action of the outer housing to transmit a rotational force to the sleeve.

In a further important aspect of the invention, the tang of the aforementioned inset pin provides access to the pin whereby it can be readily removed to permit easy and quick disassembly of the housing sections to provide seal access for seal replacement when required. At such time as seal replacement is undertaken, roller tampering in the manner of the prior art is obviously discouraged by the permanency of the aperture closures that have been provided.

In a still further important aspect of the invention there is provided a detachable guard comprising a collar/sleeve locally secured about the outer sleeve so as to shroud the tang slot and preclude immediate access to the tang without first removing the guard sleeve. Utilizing the guard sleeve serves to safeguard the tang by minimizing the likelihood of tampering while preventing any environmental damage during use.

It is therefore an object of the invention to provide a novel hydraulic coupling structure for a non pressure balanced fluid conducting swivel joint.

It is a still further object of the invention to effect the previous object with a novel construction that substantially eases disassembly for servicing while substantially if not completely eliminates the tampering problems previously associated with such similar purpose structures of the prior art.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 1:
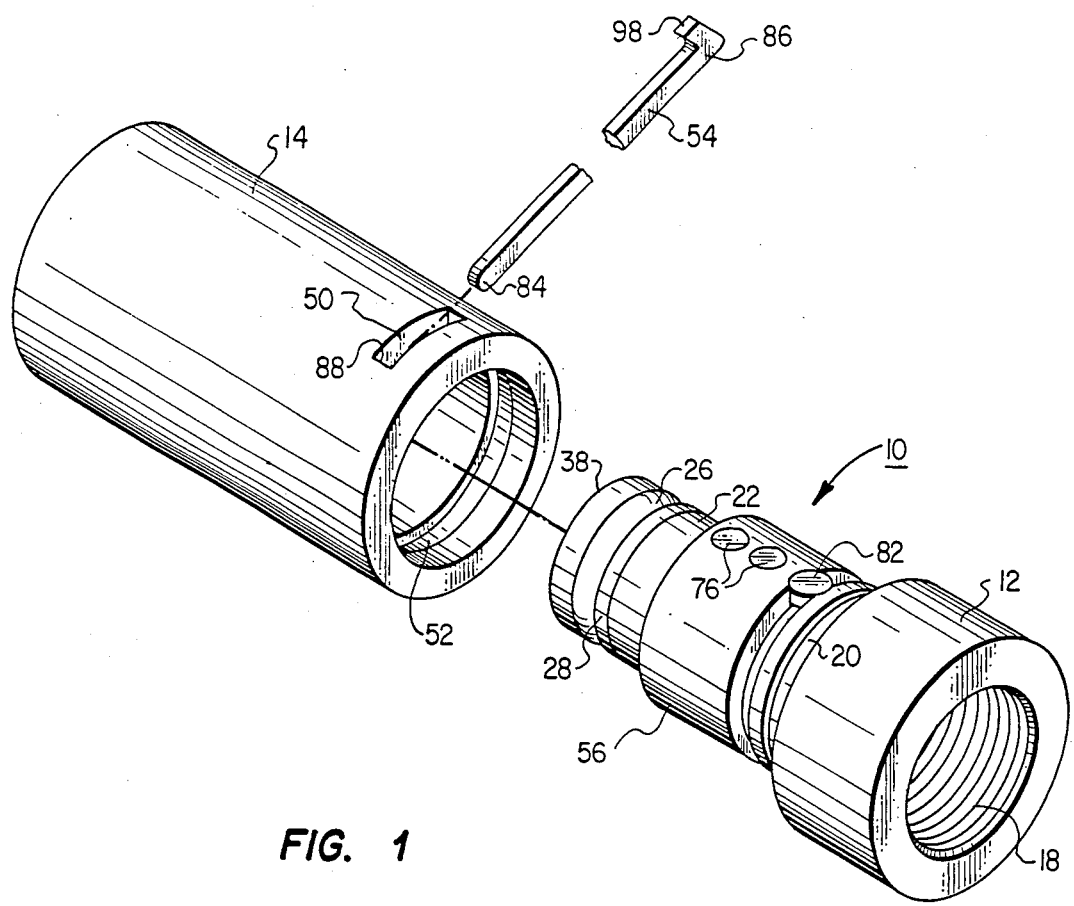
FIG. 1 is an isometric partially assembled view of the swivel joint apparatus hereof.

In the description which follows, like parts are marked throughout the specification and drawing with the same reference numerals respectively. The drawing figures are not necessarily to scale and certain views parts may be drawn rotated into the plane of the drawing for purposes of clarity.

Figure 2:
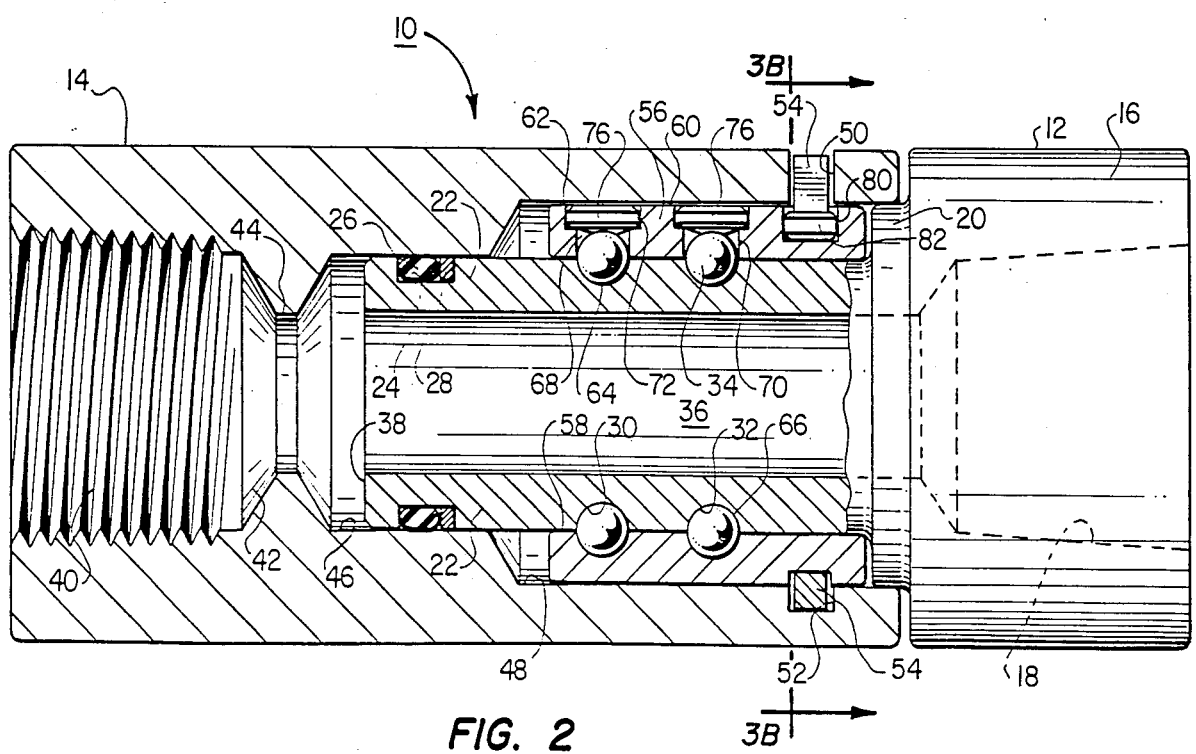
FIG. 2 is a longitudinal view partially in section of the apparatus hereof.
Figure 3A:
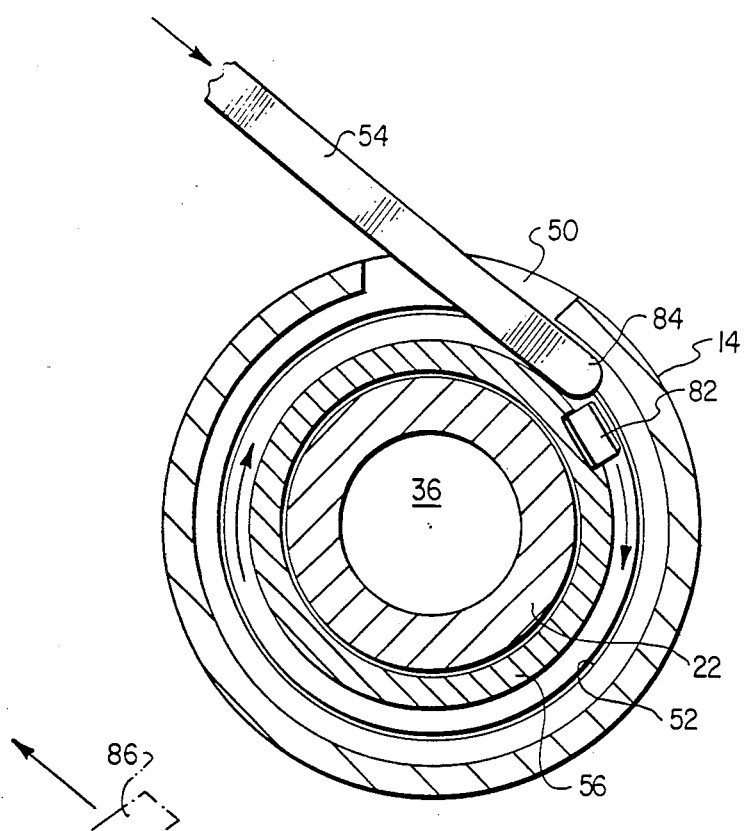
FIGS. 3A and 3B are sectional views taken substantially from the position 3—3 of FIG. 2 for the assembly and disassembly respectively of the apparatus hereof.
Figure 3B:
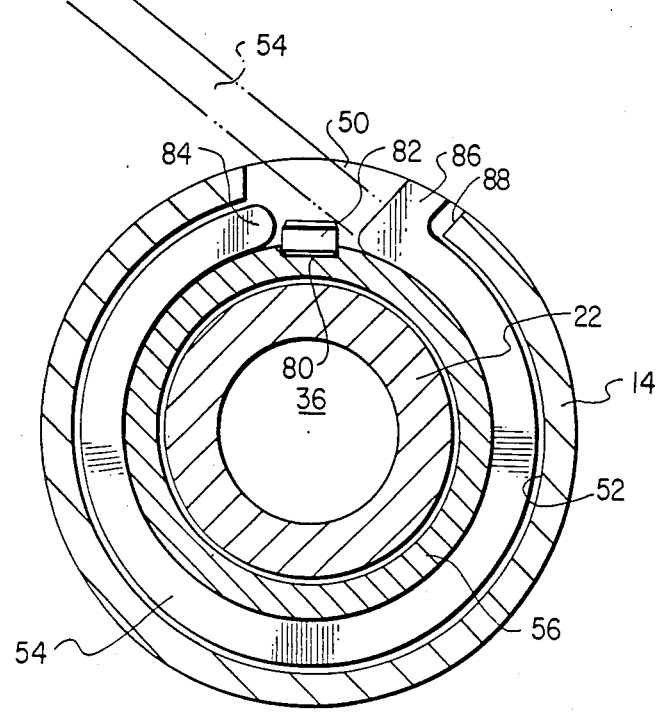

Referring now to FIGS. 1-3, there is disclosed a swivel joint coupling hereof generally designated 10 and comprised of a first housing section 12 and a second housing section 14. The housing sections are adapted to be coaxially interfitted and secured together and which when assembled permit relative bidirectional rotation between sections while resisting encountered thrust loads tending to urge separation of the sections.

First housing section 12 is comprised of an end portion 16 defining a threaded inlet 18 adapted to receive a threaded connection of a fluid conduit to be connected therewith. Contiguous thereto is a stepped down annular flange 20 which in turn is necked down to merge with an elongated axially extending tubular insert portion 22. Formed in the periphery of the insert 22 is a first annular recess 24 containing a resilient elastomeric O-ring seal 26 backed by a less resilient elastomeric ring 28. Inwardly spaced from the seal is a pair of semi-spherical axially spaced annular recesses 30 and 32 defining the inner races in which to receive roller balls 34. The central flow passage 36 extends from the inlet 18 to the distal end 38 of the insert 22.

Second housing section 14 includes a threaded outlet 40 surrounding a central bore 42 that is necked down at 44 substantially concentric and of common diameter with the internal diameter of bore 36. Inwardly therefrom, bore 44 is enlarged to diameter 46 and counterbored still larger at 48 of diameter substantially coincident with the diameter of flange 20. This permits receipt of insert 22 interfitted in the manner illustrated in FIG.

2 in which the insert 22 is partially received within the bore 46 in a relatively close fitting relation enabling seal 26 to be compressed into a sealing engagement therebetween. Formed extending radially through the periphery of housing section 14 is an arcuate slot 50 while formed in the internal surface of counterbore 48 complementary to slot 50 is a substantially annular radial groove 52 in which to receive a rotational driving pin 54 as will be explained.

To secure the housing sections 12 and 14 for relative bidirectional rotation therebetween while withstanding thrust loads tending to urge their separation, there is provided a third sleevelike member 56 of internal diameter 58. The sleeve is mounted within the bore 48 in a slip fit over the outside diameter of insert 22 while having an outside diameter 60 less than the internal diameter of counterbore 48 so as to define an annular intervening clearance 62. The internal diameter of sleeve member 56 includes spaced apart annular semi-spherical recesses 64 and 66 which complement and cooperate with recesses 30 and 32 for defining the outer races of roller balls 34. At preselected locations about recesses 64 and 66 there are contained drilled radial apertures 68 and 70 which communicate outwardly with counterbores 72 and 74 respectively and through which balls 34 can be loaded into the respective bearing races.

Received and secured within the counterbores as by stacking or press fit are permanent aperture closures in the form of a button-like plug 76. Each plug includes a cupped undersurface 78 for engagement with the rolling surface of a ball 34 passing thereunder. The sizing of plug 76 is in addition to being force fit into the counterbore includes a radial dimension equal or less than that of the counterbore. This enables the uppermost surface of the plug to be generally flush or within the peripheral contour of the outside diameter 60 of sleeve 56 so as not to afford any interference with the clearance 62 between the outside diameter 60 of sleeve 56 and the internal diameter of counterbore 48. Also defined axially rightward thereof is a localized recess 80 adapted to contain an interfering hard metal button-like insert 82 for aiding in the assembly and disassembly of the apparatus and effecting the rotational interlock to be described.

Driving pin 54, utilized for rotationally interlocking housing section 14 with middle sleeve 56, is of square section and of durable and sufficiently flexible composition as will enable it to formfit within the circular groove 52. At its innermost end 84 the pin is of a relative circular profile while at its opposite outermost distal end the pin is offset in a hooklike tanged offset 86.

To effect operational assembly of the housing sections 12 and 14, it is necessary that they first be assembled interfitted including sleeve 56 in the manner of FIG. 2. Once arranged in that relation driving pin 54 is inserted through slot opening 50 in the manner illustrated in FIG. 3A whereby pin end 84 engages button 82 and causing sleeve 56 to be rotated. By continuing to insert pin 54 inwardly, it will ultimately extend circumferentially in slot 52 in an encircling circumscribing relation about sleeve 56 in the manner shown solid in FIG. 3B. At that point the hook end 86 of pin 54 engages the inner end 88 of slot 50 with button 82 being situated between the ends 84 and 86. Any independent movement of the pin is thereafter limited to the arcuate extent of slot 50. At such time however as disassembly is required for access to replace O-ring seal 26, pin 54 can be withdrawn by drawing end 86 outward of slot 50 in the manner shown in phantom in FIG. 3B.

Figure 4:
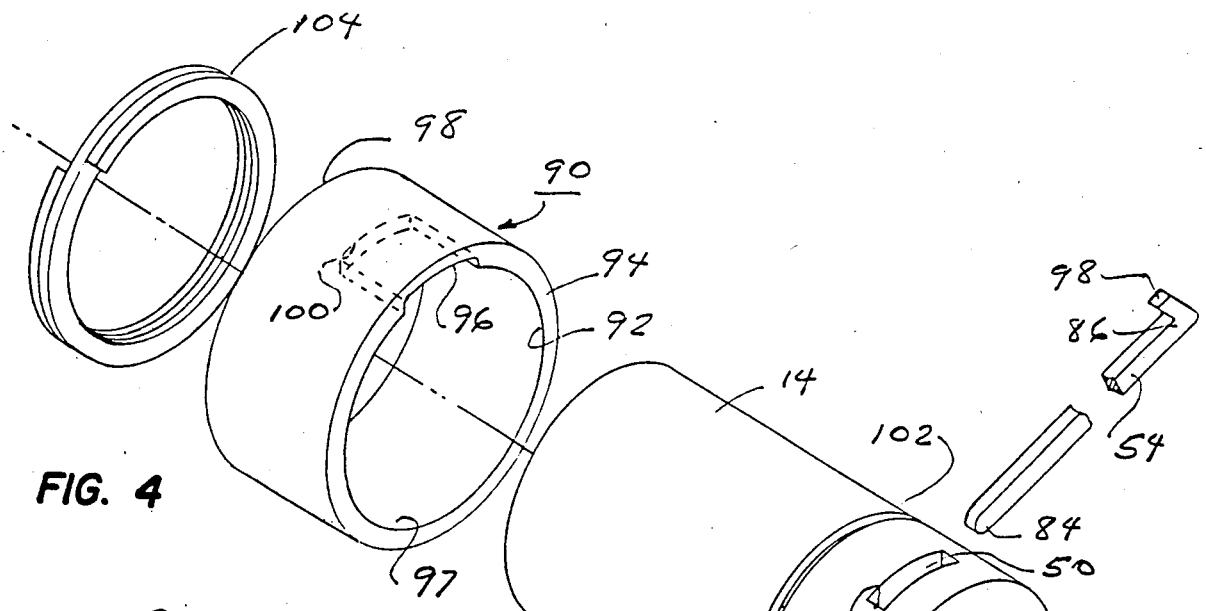
FIG. 4 is a fragmentary isometric view similar to FIG. 1 for an alternate construction.
Figure 5:
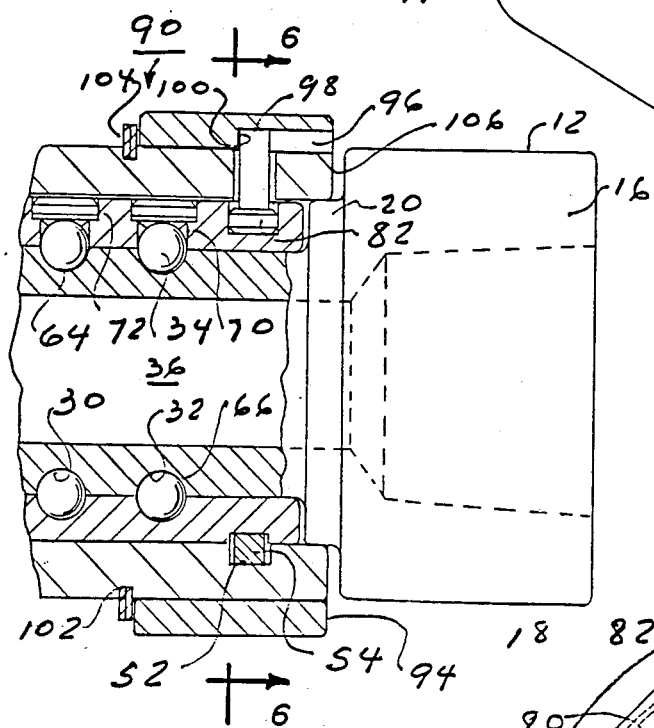
FIG. 5 is a fragmentary view similar to FIG. 2 for the alternate construction of FIG. 4.
Figure 6:
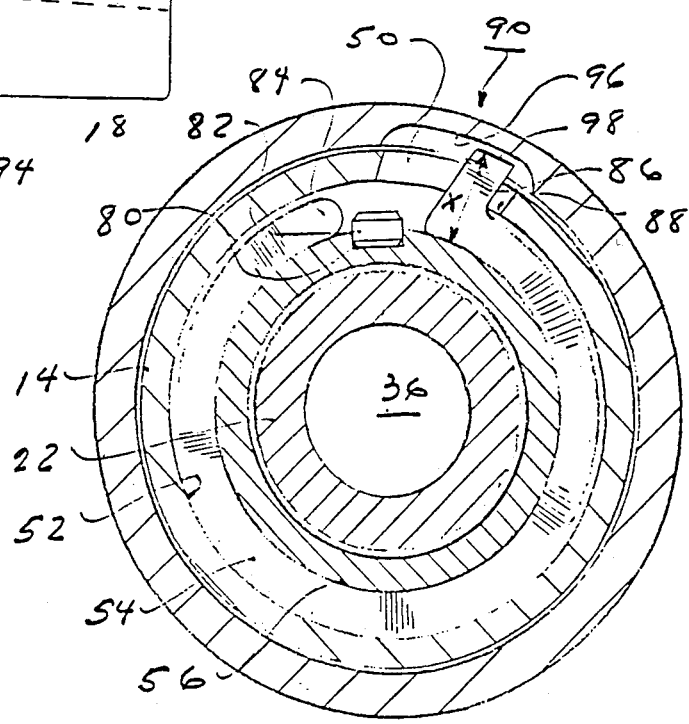
FIG. 6 is a sectional view taken substantially from the position 6—6 of FIG. 5.

In order to minimize the likelihood of tampering with tang 86 while protecting it against inadvertent environmental damage during product use, there is provided a shield guard 90 as will now be described with specific reference to FIGS. 4–6. Guard 90 comprises a relatively short length of annular sleeve or collar having an internal diameter 92 sized to permit a slip-on receipt about the external diameter of outer sleeve 14. At a localized location extending laterally inward from the plane of end face 94 is an arcuate recess 96 outward of its bore 97 in which to receive the distal end 98 of tang 86. It will be appreciated for purposes of this embodiment that the offset length "x" of tang 86 to end 98 is slightly greater than before so as to extend outward of slot 50 beyond the periphery of sleeve 14 into the cavity of recess 96.

The arcuate length of guard recess 96 is sized so as to be superposed and generally coextensive with slot 50 while inwardly it is terminated in the lateral direction by a radial shoulder 100. To accommodate receipt and retention of the guard sleeve 90 in the assembly of coupling 10, the outer periphery of sleeve 14 includes an annular groove 102 in which to receive a helically coiled type retaining ring 104. Being of a coiled type enable ring 104 to be expanded for placement over the outside diameter of sleeve 14 into groove 102. The longitudinal location of groove 102 in this relation is correlated to the selected axial dimensions of guard sleeve 90 such that when assembled in the manner of FIG. 5 recess shoulder 100 will be positioned substantially juxtaposed to the confronting side face of tang 86 thereat. Preferably, end face 94 in this relation will terminate coextensive with the plane of sleeve 14 end face 106 thereat.

With guard sleeve 90 being assembled in the foregoing relation, it provides a shroud over arcuate slot 50 and renders tang 86 of pin 54 generally inaccessible without first removing sleeve 90. Being shrouded in that manner the tang end 98 is both guarded and retained by its nested interfit within recess 96. Removal of guard 90 can conveniently be effected when required by first removing retaining ring 104 after which the guard can be slipped off sleeve 14 to expose tang 86 and slot 50.

By the above description there is disclosed a novel non pressure balanced swivel joint construction for the coupling of high pressure conduit, The construction thereof enables relatively simple threadless disassembly of the housing sections at such time as seal servicing is required and is achieved without sacrificing the rotational and thrust requirements of the joint. Not only is disassembly accomplished in a relative easy manner as compared to such similar purpose prior art devices but access to the ball races is so permanently secured as to minimize if not eliminate the tampering effects that had previously been incurred with such prior constructions. Notwithstanding, the virtues of this construction are achieved without use of more costly features so as to enable production of a cost competitive product affording improvements previously unknown. By utilizing the sleeve guard hereof, access to the driving pin is substantially precluded so as to minimize the possibility of tampering while preventing exposure damage from the working environment that might otherwise occur. At the same time use of the sleeve guard assures proper assembly of the drive pin by preventing placement of the sleeve guard unless the tang end of the pin can be received in the recess thereof.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A swivel joint for the coupling of fluid conduit comprising in combination:
   (a) a first tubular housing section defining an axially extending bore and an inlet having means for connecting an end of a first fluid conduit;
   (b) a second tubular housing section defining an axially extending bore and an outlet having means for connecting a second fluid conduit with which said first fluid conduit is to be coupled;
   (c) said housing section being arranged with one section internally interfit within the other in a coaxial alignment and in bore communication with each other;
   (d) seal means contained between opposing interfitted surfaces of said housing sections for effecting a seal relation preventing leakage of fluid content from within said bores;
   (e) a sleeve member supported about an inner of said housing sections intervening in a clearance space defined between opposing surfaces of said interfitted sections, said sleeve member and the inner housing section surface thereat defining complemental inner and outer races containing a plurality of individual bearing members for affording relative rotation between said sleeve and the inner of said sections;
   (f) mutual grooves annularly defined between said sleeve and the outer of said sections; and
   (g) threadless interlock means including an interlock member removably positioned in said mutual grooves for cooperatively effecting threadless interlocks both rotational and axial between said sleeve and the outer of said sections.

2. A swivel joint in accordance with claim 1 in which said outer housing section includes a radial slot communicating outward through the periphery thereof and in registry with said mutual grooves and said interlock member is slidably insertable and removable through said slot for effecting and diseffecting said interlocks.

3. A swivel joint according to claim 2 in which said interlock member comprises elongated pin means extending through said slot to within and about the substantial circumferential extent of said groove and said interlock means includes cooperative means operably cooperative with said pin means to rotationally interlock said pin means between said sleeve member and said outer housing section for providing a rotational drive relation between said sleeve member and said outer housing section relative to said inner housing section.

4. A swivel joint according to claim 3 in which said pin means includes an end accessible through said slot from the exterior of said joint and said pin means is removable from said groove by withdrawing said accessible end through said slot to enable disassembly of said housing sections.

5. A swivel joint according to claim 3 in which said cooperative means includes an insert means secured in one of the opposing surfaces defining said mutual grooves to protrude into at least one of said mutual grooves in an orientation positioned circumferentially intervening between the ends of said pin means in said mutual grooves.

6. A swivel joint according to claim 5 in which said slot is elongated and said pin means includes an angularly offset tang at its outwardmost distal end adapted when said pin means is operably positioned in said mutual grooves to be located in said slot accesible from the exterior of said joint while effecting a fitted engagement with at least one wall defining said slot.

7. A swivel joint according to claim 5 in which said insert means comprises a member secured radially upright in one of said mutual grooves and said pin means is adapted to engage said insert member for effecting said drive relation.

8. A swivel joint according to claim 7 in which said sleeve member includes a counterbore in communication with said mutual grooves and said insert member is of a buttonlike configuration secured in said counterbore to extend upstanding in at least one of said mutual grooves.

9. A swivel joint according to claim 3 including an aperture defined in said sleeve member in communication with at least one of said complementary bearing races through which said individual bearing members are circumferentially loaded within at least one of said bearing races and there is included means affording a substantially permanent closure of said loading aperture for inhibiting tampering after said at least one of said races has been loaded.

10. A swivel joint according to claim 9 in which said loading aperture includes a counterbore at the radially outward end thereof and said permanent closure means is contained in a secured relation in said counterbore.

11. A swivel joint according to claim 10 in which said closure means is secured press fit in the counterbore of said loading aperture.

12. A swivel joint according to claim 2 including removable guard means disposed about the outer of said sections in a shrouding relation to said slot for precluding removal access to said interlock member.

13. A swivel joint according to claim 12 in which said guard means comprises an external sleeve and there is included retention means to axially secure said external sleeve in said shrouding relation.

14. A swivel joint according to claim 13 in which said slot is arcuately elongated, said interlock member comprises pin means having an angularly offset tang at its outwardmost distal end adapted when said pin means is operably positioned in said mutual grooves to extend outward of said slot and said external sleeve includes a radially extending recess in the bore wall in which to receive the distal end of said tang.

15. A swivel joint according to claim 14 in which said recess also extends arcuately for a segmental distance generally coextensive with the arcuate elongation of said slot.

16. A swivel joint according to claim 14 in which said external sleeve includes a radial shoulder defining an end wall of said recess, said shoulder is adapted to confront a side face of said tang to prevent axial displacement of said sleeve from said shrouding relation in one direction and there is provided retention means to prevent axial displacement of said sleeve from said shrouding relation in an opposite direction.

17. A swivel joint according to claim 16 in which said retention means comprises a retainer ring secured to the periphery of the outer of said sections in the removal path of said external sleeve.

18. A swivel joint according to claim 17 in which the outer section periphery includes an annular groove and said retainer ring is mounted in said annular groove adjacent to an end face of said external sleeve.

19. A swivel joint according to claim 1 in which said complemental inner and outer races comprises at least two of said complemental inner and outer races individually spaced axially from each other.

* * * * *